United States Patent
Rui

(10) Patent No.: US 8,060,764 B2
(45) Date of Patent: Nov. 15, 2011

(54) POWER SUPPLY CONVERTING CIRCUIT

(75) Inventor: Yi Rui, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 413 days.

(21) Appl. No.: 12/464,086

(22) Filed: May 11, 2009

(65) Prior Publication Data

US 2010/0268969 A1    Oct. 21, 2010

(30) Foreign Application Priority Data

Apr. 21, 2009  (CN) .......................... 2009 1 0301704

(51) Int. Cl.
*G06F 1/26* (2006.01)
*G05F 1/00* (2006.01)
(52) U.S. Cl. ........................ 713/300; 323/283
(58) Field of Classification Search .................. 713/300
See application file for complete search history.

(56) References Cited

U.S. PATENT DOCUMENTS

| | | | | |
|---|---|---|---|---|
| 7,802,122 | B2 * | 9/2010 | Park ............................. | 713/340 |
| 2007/0061601 | A1 * | 3/2007 | Park ............................. | 713/300 |
| 2008/0238390 | A1 * | 10/2008 | Trivedi et al. ................. | 323/283 |
| 2009/0019295 | A1 * | 1/2009 | Wu et al. ....................... | 713/300 |
| 2009/0199021 | A1 * | 8/2009 | Chu et al. ...................... | 713/300 |
| 2009/0276641 | A1 * | 11/2009 | Peng et al. ..................... | 713/300 |
| 2010/0033151 | A1 * | 2/2010 | Wu et al. ....................... | 323/285 |

FOREIGN PATENT DOCUMENTS

CN     101344810 A     1/2009

* cited by examiner

*Primary Examiner* — Ryan Stiglic

(74) *Attorney, Agent, or Firm* — Altis Law Group, Inc.

(57) ABSTRACT

A power supply converting circuit includes a multi-phase pulse-width modulation (PWM) controller, a single-phase PWM controller, some first voltage converting circuits, a second voltage converting circuit, first and second electrical switch units. The multi-phase PWM controller provides some first PWM signals and a second PWM signal. The single-phase PWM controller provides a third PWM signal. The first voltage converting circuits receive the first PWM signals to output a first power supply to a central processing unit (CPU) chipset. The first electrical switch unit receives the second and third PWM signals to selectively output the second or third PWM signal to the second voltage converting circuit to output one of the first and second power supplies. The second electrical switch unit receives one of the first and second power supplies from the second voltage converting circuit to selectively output one of the first and second power supplies to the CPU chipset.

15 Claims, 1 Drawing Sheet

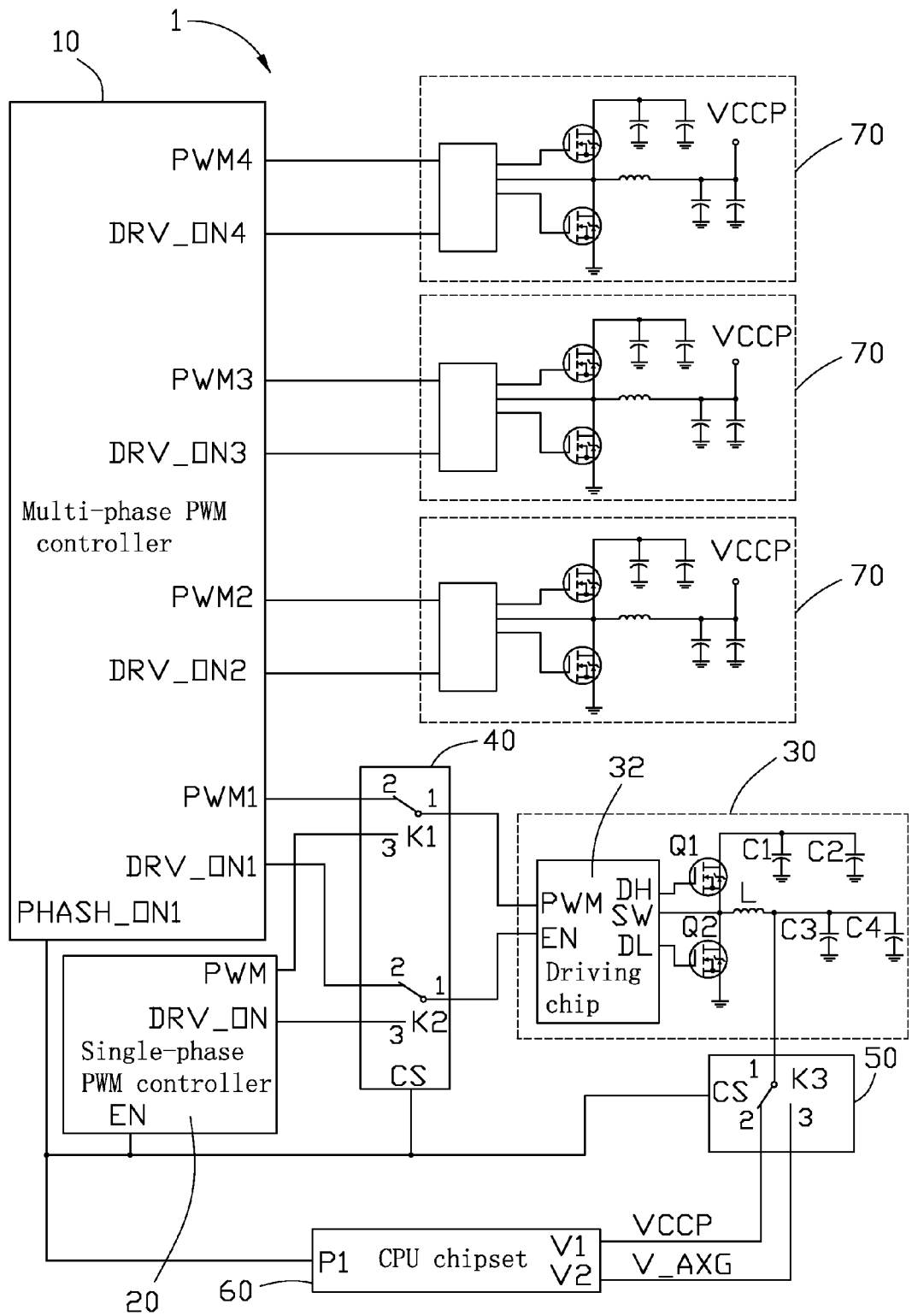

POWER SUPPLY CONVERTING CIRCUIT

BACKGROUND

1. Technical Field

The present disclosure relates to a power supply converting circuit.

2. Description of Related Art

Nowadays, central processing unit (CPU) chipsets of motherboards can be classified as two types, a first type having not having an integrated graphics unit, and a second type having an integrated graphics unit. Each of the two types of CPU chipsets can be installed in one motherboard. The first type of CPU chipset only needs one power supply, called VCCP, to work. The second type of CPU chipset needs the VCCP power supply, and another power supply called V_AXG.

To install the two types of CPU chipset in a motherboard, the motherboard needs to have a VCCP power supply module and a V_AXG power supply module, where the two power supply modules are independent of each other. However, if a user chooses the first type of CPU chipset, the V_AXG power supply module will be unused, therefore a voltage converting circuit (may include a driving chip, some transistors, an inductor, and some capacitors) of the V_AXG power supply module is idle, which occupies space of the motherboard and increases costs.

BRIEF DESCRIPTION OF THE DRAWINGS

The FIGURE is a circuit diagram of an exemplary embodiment of a power supply converting circuit, together with a CPU chipset.

DETAILED DESCRIPTION

The FIGURE is an exemplary embodiment of a power supply converting circuit 1 used to supply power to a central processing unit (CPU) chipset 60. The power supply converting circuit 1 includes a multi-phase pulse-width modulation (PWM) controller 10, a single-phase PWM controller 20, three first converting circuits 70, a second voltage converting circuit 30, a first electrical switch unit 40, and a second electrical switch unit 50.

When the CPU chipset 60 is a first type CPU chipset that does not have an integrated graphics unit, the three first voltage converting circuits 70 and the second voltage converting circuit 30 supply four VCCP power supplies VCCP to the CPU chipset 60. When the CPU chipset 60 is a second type CPU chipset that has an integrated graphics unit, the three first voltage converting circuits 70 supply three VCCP power supplies VCCP to the CPU chipset 60, and the second voltage converting circuit 30 supplies a V_AXG power supply V_AXG to the CPU chipset 60. In one embodiment, the multi-phase PWM controller 10, which is a four-phase PWM controller, provides four phases of PWM signals to the three first voltage converting circuits 70 and the second voltage converting circuits 30. In other embodiments, the number of the first voltage converting circuits 70 can be changed according to requirements, the number of the phases of the multi-phase PWM controller 10 can be changed based on the number of the first voltage converting circuits 70.

In one embodiment, the first electrical switch unit 40 is an electrical switch chip having two single-pole double-throw (SPDT) switches K1, K2, and a control pin CS. The control pin CS of the first electrical switch unit 40 can receive a control signal to control the two SPDT switches K1 and K2.

The second electrical switch unit 50 is an electrical switch chip having a single-pole double-throw (SPDT) switch K3, and a control pin CS. The control pin CS of the second electrical switch unit 50 can receive a control signal to control the SPDT switch K3.

The multi-phase PWM controller 10 includes four PWM signal output terminals PWM1-PWM4, four driving terminals DRV_ON1-DRV_ON4, and four enable terminals to control output of the four PWM signal output terminals PWM1-PWM4. FIG. 1 only shows one enable terminal PHASH_ON1 to control output of the PWM signal output terminal PWM1, and the other enable terminals are unused.

The single-phase PWM controller 20 includes a PWM signal output terminal PWM, a driving terminal DRV_ON, and an enable terminal EN to control working states of the single-phase PWM controller 20.

Each of the first voltage converting circuits 70 and the second voltage converting circuit 30 are the same, and each includes a driving chip 32, two field effect transistors (FETs) Q1 and Q2, an inductor L, and four capacitors C1-C4. A gate of the FET Q1 is connected to a high-pass driving pin DH of the driving chip 32. A drain of the FET Q1 is grounded via the capacitors C1 and C2 respectively. A source of the FET Q1 is connected to an output terminal SW of the driving chip 32, a drain of the FET Q2, and a first terminal of the inductor L. A gate of the FET Q2 is connected to a low-pass driving pin DL of the driving chip 32. A source of the FET Q2 is grounded. A second terminal of the inductor L is grounded via the capacitors C3 and C4 respectively, and outputs VCCP power supply VCCP or the V_AXG power supply V_AXG to the CPU chipset 60. A PWM signal receiving terminal PWM of the driving chip 32 receives a PWM signal. An enable terminal EN of the driving chip 32 receives a driving signal to drive the driving chip 32.

The PWM signal output terminals PWM2-PWM4 of the multi-phase PWM controller 10 are respectively connected to the PWM signal receiving terminals PWM of the driving chips 32 of the three first voltage converting circuits 70. The driving terminals DRV_ON2-DRV_ON4 of the multi-phase PWM controller 10 are respectively connected to the enable terminals EN of the three first voltage converting circuits 70. The three first voltage converting circuits 70 receive PWM signals from the PWM signal output terminals PWM2-PWM4 of the multi-phase PWM controller 10 and receive driving signals from the driving terminals DRV_ON2-DRV_ON4 of the multi-phase PWM controller 10, to output power from the three VCCP power supplies VCCP to the CPU chipset 60.

The PWM signal output terminal PWM1 and driving terminal DRV_ON1 of the multi-phase PWM controller 10 are respectively connected to throws 2 of the SPDT switches K1 and K2. The PWM signal output terminal PWM and driving terminal DRV_ON of the single-phase PWM controller 20 are respectively connected to throws 3 of the SPDT switches K1 and K2. Poles 1 of the SPDT switches K1 and K2 are respectively connected to the PWM signal receiving terminal PWM and enable terminal EN of the driving chip 32 of the second voltage converting circuit 30. The second terminal of the inductor L of the second voltage converting circuit 30 is connected to a pole 1 of the SPDT switch K3. Two throws 2 and 3 of the SPDT switch K3 are respectively connected to a VCCP power supply receiving terminal V1 and a V_AXG power supply receiving terminal V2 of the CPU chipset 60. A control pin P1 of the CPU chipset 60 is connected to the enable terminal PHASH_ON1 of the multi-phase PWM controller 10, the enable terminal EN of the single-phase PWM controller 20, the control pin CS of the first electrical switch unit 40, and the control pin CS of the second electrical switch unit 50.

In use, when the CPU chipset 60 is the first type CPU chipset, which does not have an integrated graphics unit, the CPU chipset 60 outputs a first control signal, such as a high voltage signal (e.g., a 5V voltage signal), via the control pin P1 to the enable terminal PHASH_ON1 of the multi-phase PWM controller 10, the enable terminal EN of the single-phase PWM controller 20, the control pin CS of the first electrical switch unit 40, and the control pin CS of the second electrical switch unit 50. At this time, the PWM signal output terminals PWM1-PWM4 of the multi-phase PWM controller 10 output four PWM signals and the driving terminals DRV_ON1-DRV_ON4 of the multi-phase PWM controller 10 output four driving signals, while the single-phase PWM controller 20 does not work. The poles 1 are connected to the throws 2 of the SPDT switches K1, K2 and K3 respectively, therefore the three first voltage converting circuits 70 and the second voltage converting circuit 30 all output the VCCP power supplies VCCP to the CPU chipset 60.

When the CPU chipset 60 is the second type CPU chipset, which has an integrated graphics unit, the CPU chipset 60 outputs a second control signal, such as a low voltage signal (e.g., a 0V voltage signal), via the control pin P1 to the enable terminal PHASH_ON1 of the multi-phase PWM controller 10, the enable terminal EN of the single-phase PWM controller 20, the control pin CS of the first electrical switch unit 40, and the control pin CS of the second electrical switch unit 50. At this time, the PWM signal output terminals PWM2-PWM4 of the multi-phase PWM controller 10 output three PWM signals and the driving terminals DRV_ON2-DRV_ON4 of the multi-phase PWM controller 10 output three driving signals, while the PWM signal output terminal PWM1 and driving terminal DRV_ON1 of the multi-phase PWM controller 10 do not output signals. The PWM signal output terminal PWM and driving terminal DRV_ON of the single-phase PWM controller 20 output a PWM signal and a driving signal. The poles 1 are connected to the throws 3 of the SPDT switches K1, K2 and K3 respectively, therefore the three first voltage converting circuits 70 output the VCCP power supplies VCCP to the CPU chipset 60, and the second voltage converting circuit 30 output the V_AXG power supply V-AXG to the CPU chipset 60.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power supply converting circuit to supply first and second power supplies to a central processing unit (CPU) chipset, the power supply converting circuit comprising:
    a multi-phase pulse-width modulation (PWM) controller, operable to provide a plurality of first PWM signals and a second PWM signal, and receive a control signal from the CPU chipset to control output of the second PWM signal;
    a single-phase PWM controller, operable to provide a third PWM signal;
    a plurality of first voltage converting circuits, operable to receive the plurality of first PWM signals to output the first power supply to the CPU chipset;
    a second voltage converting circuit;
    a first electrical switch unit, operable to receive the second and third PWM signals, and receive the control signal from the CPU chipset to selectively output one of the second and third PWM signals to the second voltage converting circuit, such that the second voltage converting circuit selectively outputs one of the first and second power supplies to the CPU chipset; and
    a second electrical switch unit, operable to receive one of the first and second power supplies from the second voltage converting circuit, and receive the control signal from the CPU chipset to selectively output one of the first and second power supplies to the CPU chipset.

2. The power supply converting circuit of claim 1, wherein the number of the plurality of first PWM signals is three, and the number of the plurality of first voltage converting circuits is three.

3. The power supply converting circuit of claim 1, wherein the first electrical switch unit comprises two single-pole double-throw (SPDT) switches and a control pin, the control pin of the electrical switch chip to receive the control signal from the CPU chipset to control the poles of the two SPDT switches to be selectively connected to the first throw or second throw of the two SPDT switches.

4. The power supply converting circuit of claim 3, wherein two control terminals of the multi-phase PWM controller are respectively connected to first throws of the two SPDT switches, two control terminals of the single-phase PWM controller are respectively connected to second throws of the two SPDT switches, poles of the two SPDT switches are respectively connected to two control terminals of the second voltage converting circuit.

5. The power supply converting circuit of claim 4, wherein the two control terminals of the multi-phase PWM controller are a PWM signal output terminal and a driving terminal corresponding to the second PWM signal, the two control terminals of the single-phase PWM controller are a PWM signal output terminal and a driving terminal, the two control terminals of the second voltage converting circuit are a PWM signal receiving terminal and an enable terminal.

6. The power supply converting circuit of claim 5, wherein an output terminal of the second voltage converting circuit is connected to a pole of the SPDT switch, first and second throws of the SPDT switch are respectively connected to first and second power supply receiving terminals of the CPU chipset.

7. The power supply converting circuit of claim 1, wherein the second electrical switch unit comprises a single-pole double-throw (SPDT) switch and a control pin, the control pin to receive the control signal from the CPU chipset to control the pole of the SPDT switch to be selectively connected to the first throw or second throw of the SPDT switch.

8. The power supply converting circuit of claim 1, wherein each of the first and second voltage converting circuits includes a driving chip, first and second field effect transistors (FETs), and an inductor, an enable terminal of the driving chip to receive a driving signal to drive the driving chip to output the first or second power supply via the inductor.

9. The power supply converting circuit of claim 8, wherein the first FET receives a high-pass driving signal from the driving chip, the second FET receives a low-pass driving signal from the driving chip, the inductor receives an output signal from an output terminal of the driving chip, and the driving chip receives the second or third PWM signal.

10. The power supply converting circuit of claim 9, wherein a gate of the first FET is connected to a high-pass driving pin of the driving chip, a drain of the first FET is grounded via two capacitors respectively, a source of the first FET is connected to the output terminal of the driving chip.

11. The power supply converting circuit of claim 9, wherein a gate of the second FET is connected to a low-pass driving pin of the driving chip, a source of the second FET is grounded, a drain of the second FET is connected to the output terminal of the driving chip.

12. The power supply converting circuit of claim 8, wherein a plurality of PWM signal output terminals of the multi-phase PWM controller is respectively connected to PWM signal receiving terminals of the driving chips of the plurality of first voltage converting circuits, a plurality of driving terminals of the multi-phase PWM controller is respectively connected to enable terminals of the driving chips of the plurality of first voltage converting circuits.

13. The power supply converting circuit of claim 1, wherein an enable terminal corresponding to the second PWM signal of the multi-phase PWM controller, an enable terminal of the single-phase PWM controller, a control pin of the first electrical switch unit, and a control pin of the second electrical switch unit are connected to a control pin of the CPU chipset, to receive the control signal from the CPU chipset.

14. The power supply converting circuit of claim 13, wherein the first electrical switch unit outputs the second PWM signal and the second electrical switch unit outputs the first power supply to the CPU chipset in response to the control pin of the CPU chipset outputting a high voltage signal.

15. The power supply converting circuit of claim 13, wherein the first electrical switch unit outputs the third PWM signal and the second electrical switch unit outputs the second power supply to the CPU chipset in response to the control pin of the CPU chipset outputting a low voltage signal.

* * * * *